O. S. PULLIAM.
BEARING.
APPLICATION FILED DEC. 4, 1913.

1,161,970.

Patented Nov. 30, 1915.

WITNESSES
F. E. Gaither.
Lois Wineman.

INVENTOR
Oswald S. Pulliam
by W. G. Doolittle
Attorney

UNITED STATES PATENT OFFICE.

OSWALD S. PULLIAM, OF PITTSBURGH, PENNSYLVANIA.

BEARING.

1,161,970.      Specification of Letters Patent.      Patented Nov. 30, 1915.

Application filed December 4, 1913. Serial No. 804,637.

*To all whom it may concern:*

Be it known that I, OSWALD S. PULLIAM, a citizen of the United States, residing at Pittsburgh, in the county of Allegheny and State of Pennsylvania, have invented certain new and useful Improvements in Bearings, of which the following is a specification.

This invention relates to anti-friction bearings, and has for one of its objects to provide an efficient, durable and inexpensive separator for the anti-friction devices.

Figure 1:
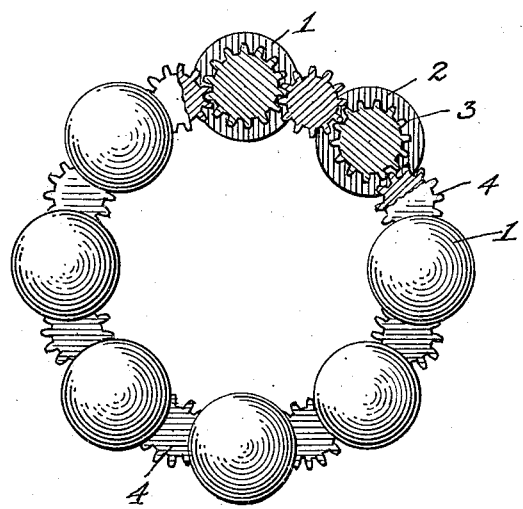
Figure 4:
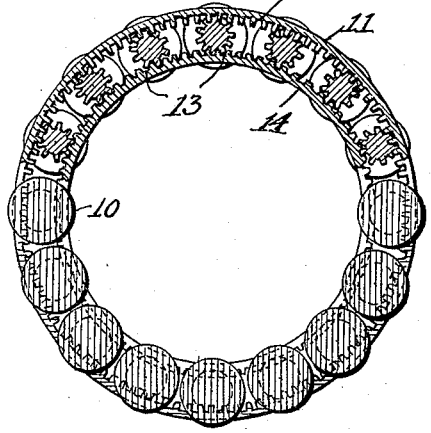
Figure 2:
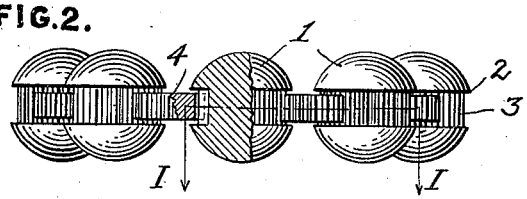
Figure 3:
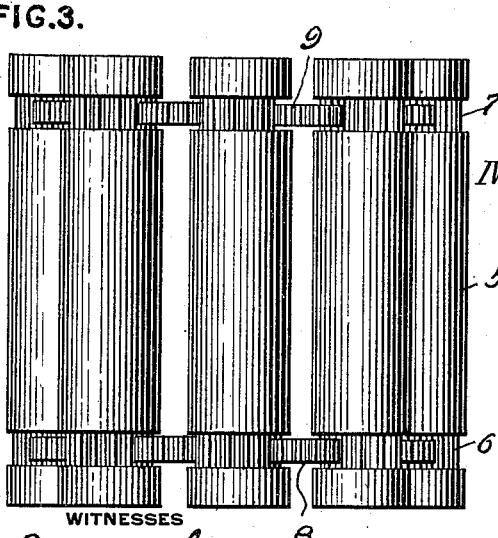

In the drawings, Figure 1 is a view partly in plan and partly in section of a plurality of anti-friction devices with the separators in position; Fig. 2 is an edge view partly in elevation and partly in section; Fig. 3 is an edge view of a slightly modified form of bearing with the separators in place; Fig. 4 is a transverse sectional view on the line IV—IV of Fig. 5 and showing a still further modification of my invention; and Fig. 5 is an edge view of the same.

Referring to the drawings by numerals of reference, 1 designates a plurality of anti-friction devices illustrated as consisting of balls having circumferential grooves or recesses 2 therein, the recesses being provided with teeth or projections 3, the teeth and wall of the recesses in each member being well within the burden bearing portion of the anti-friction device. These balls are shown as being separated, and interposed between them are separators consisting of the geared or toothed members 4 of less diameter than the diameters of the anti-friction devices and supported solely by the anti-friction members which they separate.

In Fig. 3, I have illustrated the anti-friction devices as consisting of rollers 5, near the respective ends of each of which is a toothed recess indicated by the reference numerals 6 and 7. The rollers 5 are separated by the geared disks or members 8 and 9, there being two sets of spacing members, one for each end of the group of anti-friction devices which they separate.

Figure 5:
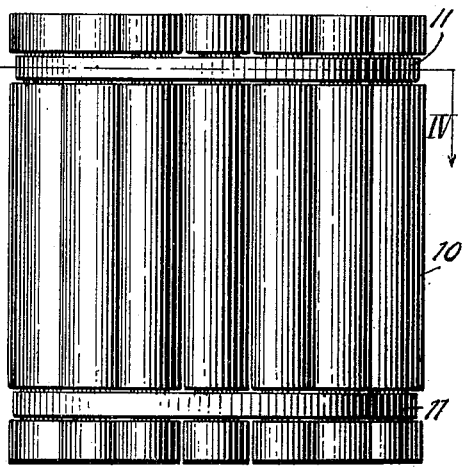

In Figs. 4 and 5, I have illustrated a further modification of my invention, in which the rollers 10 are substantially the same form as the rollers 5 shown in Fig. 3. In lieu of the separators 8 and 9, however, I may employ a toothed ring 11, the inwardly projecting teeth 12 of which mesh with the teeth 13 on the rollers 10 so as to keep them in separated position. I have also shown a toothed inner ring 14 meshing with the rollers 5, although this inner ring may not be employed under all conditions.

In lieu of the form of teeth shown, I may employ double helical or other forms of teeth for the toothed members without departing from the spirit of my invention.

What I claim is:—

1. In an anti-friction bearing, toothed bearing members, and interposed toothed separators alternating with and in mesh with the toothed portions of adjacent bearing members.

2. In an anti-friction bearing, toothed bearing members arranged circumferentially about a central point, and toothed separators also arranged about a central point alternating with and in toothed engagement with the toothed bearing members.

3. In an anti-friction bearing, a plurality of balls arranged about a circle and having annular recesses provided with teeth, and disk separators having teeth, said separators alternating with the balls and engaging the toothed portions thereof.

4. In an anti-friction bearing, toothed bearing members arranged about a circle and provided with annular recesses having teeth, the teeth being of less depth than the depth of the recesses, and toothed separators of less width than the width of the recesses, said toothed separators alternating with the bearing members and in mesh therewith.

5. In an anti-friction bearing, bearing members each having a gear rotatable therewith, each member and its gear being integral in structure with the gear of a diameter less than the diameter of the member, said gear being positioned between bearing points spaced in the direction of gear axis, and toothed spacing means meshing with the teeth of adjacent gears and movable within the orbital path traversed by the bearing and out of contact with the surfaces with which the member bearing points contact, said gear and spacing means being free from burden bearing and acting to preserve the spacing between the bearing members.

In testimony whereof I affix my signature in presence of two witnesses.

OSWALD S. PULLIAM. [L. S.]

Witnesses:
W. G. DOOLITTLE,
F. E. GAITHER.

Copies of this patent may be obtained for five cents each, by addressing the "Commissioner of Patents, Washington, D. C."